B. SEGAL.
FASTENING DEVICE.
APPLICATION FILED MAR. 8, 1917.
1,234,810.
Patented July 31, 1917.
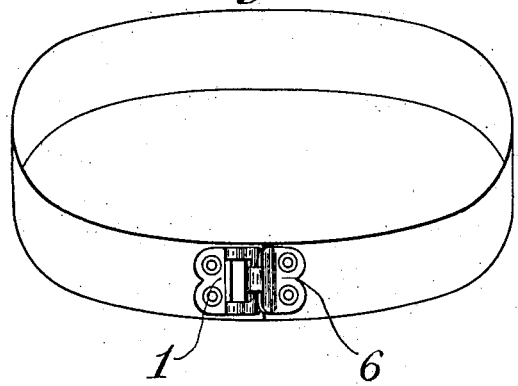
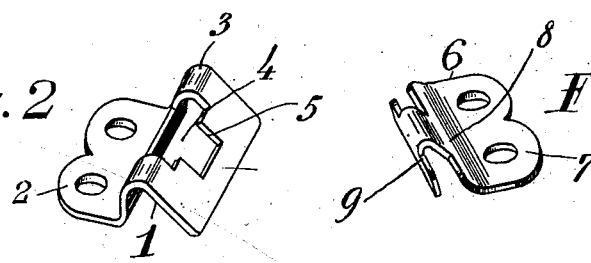 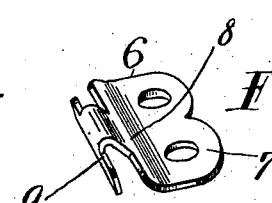
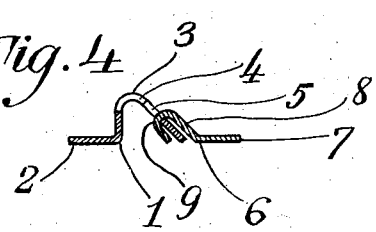 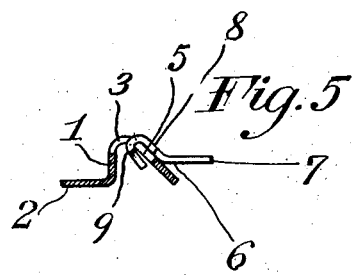
Inventor
Bernard Segal
By his Attorney

UNITED STATES PATENT OFFICE.

BERNARD SEGAL, OF NEW YORK, N. Y.

FASTENING DEVICE.

1,234,810. Specification of Letters Patent. Patented July 31, 1917.

Application filed March 8, 1917. Serial No. 153,232.

*To all whom it may concern:*

Be it known that I, BERNARD SEGAL, a citizen of the United States of America, residing at Manhattan, city, county, and State of New York, have invented certain new and useful Improvements in Fastening Devices, of which the following is a specification.

My invention relates to fastening devices, particularly such as are used to join the adjacent ends of belts, waist bands, corset edges and other articles, and consists in the specific form and construction of parts described and claimed,—a distinctive feature being the hump-like shape of the interlocking parts herein shown.

Figure 1. is a perspective view of a belt or waist band, provided with such a fastening.

Fig. 2. is a perspective view of the socket members of said fastening.

Fig. 3. is a perspective view of the hook member of said fastening.

Fig. 4. is a cross sectional view of the entire fastening, two parts shown in engagement.

Fig. 5. is a similar view of said parts brought close together to show the disengaging feature which is the result of such movement.

The engagement and disengagement of ordinary clasps involves their being overlapped as far as the depth of the engaging hook and then being turned and pressed inward or outward to cause the hook to engage the socket portion.

This is often times a serious inconvenience especially to fleshy persons and to avoid such inconvenience I have devised the fastening which is the subject matter of this description.

My device consists of a socket piece. 1. adapted to be attached to a belt, waist band or other article to be fastened.

It has a base. 2. and a loop. 3. projecting first away from and then toward the line of said base, the face of the loop toward the end inclining at an angle to the main base line. This loop is provided with an aperture. 4. opening at the top of the loop, and preferably with a slot. 5. extending from said aperture toward the end of the socket piece.

The hook portion. 6. is a complemental piece comprising a base. 7. adapted to be secured to the article to be fastened, an inclined portion. 8. preferably corresponding in incline to that of the face of the socket portion and a hook. 9. of a size and shape adapted to enter the aperture.

I prefer to construct the device as shown, with the aperture. 4. wider than the slot. 5. and the hook portion longer than said slot that the ends may take under the walls of the slot when the parts are engaged but these features are optional.

It will be noticed that because of the form of the loop. 3. with its inclined face and the hook portion with its inclined part, that when the two are brought close together the hook portion. 9. will naturally enter the slot. 4. and upon a reverse movement the hook portion will engage the socket portion without the necessity for the flexing of the parts ordinarily required causing the engagement of the various parts of a clasp, furthermore than where the engaged parts are moved toward each other as shown for instance in Fig. 5. the incline. 8. of the hook will ride up the incline. 3. of the socket and the hook. 9. will pass out of the aperture. 4. by reason of the incline action of the parts without the necessity of any special bending or twisting of the band or belt itself. This is particularly so if the inclines. 8. of the hook portion are constructed wide enough to constitute wings which bear upon the incline of the socket portion beyond the side edges of the slot. 5.

The result of the construction described is the formation of the fastening whose engagement becomes automatic upon the ends being brought closer together, to disengage or separated to engage.

What I claim as my invention and desire to secure by Letters Patent is;

A fastening of the character designated, comprising a socket member having a hump-shaped portion formed with a T-shaped loop opening having its widest space at the apex of the hump and its narrower space extending down into the inclined face of said socket piece, and a coupling member consisting of a hump-shaped T-hook formed with a shank portion inclined to correspond to the said inclined face of the socket member, for the purpose described.

In testimony whereof, I have signed my name to this specification this 26th day of February 1917.

BERNARD SEGAL.

Copies of this patent may be obtained for five cents each, by addressing the "Commissioner of Patents, Washington, D. C."